(12) United States Patent
Byrne et al.

(10) Patent No.: US 9,688,225 B2
(45) Date of Patent: Jun. 27, 2017

(54) METHODS AND SYSTEMS FOR A MOBILE DEVICE TO EMULATE A VEHICLE HUMAN-MACHINE INTERFACE

(71) Applicant: Myine Electronics, Inc., Ferndale, MI (US)

(72) Inventors: John Byrne, Detroit, MI (US); Justin Dickow, Royal Oak, MI (US); Joey Ray Grover, Madison Heights, MI (US); Joel J. Fischer, Royal Oak, MI (US); Scott Smereka, Warren, MI (US); Corey Maylone, Berkley, MI (US)

(73) Assignee: Livio, Inc., Royal Oak, MI (US)

( * ) Notice: Subject to any disclaimer, the term of this patent is extended or adjusted under 35 U.S.C. 154(b) by 0 days.

(21) Appl. No.: 14/879,646

(22) Filed: Oct. 9, 2015

(65) Prior Publication Data
US 2017/0101069 A1    Apr. 13, 2017

(51) Int. Cl.
| | | |
|---|---|---|
| *B60R 16/037* | (2006.01) | |
| *B60K 35/00* | (2006.01) | |
| *B60H 1/00* | (2006.01) | |
| *H04L 29/06* | (2006.01) | |
| *H04L 29/08* | (2006.01) | |

(52) U.S. Cl.
CPC ....... *B60R 16/037* (2013.01); *B60H 1/00735* (2013.01); *B60K 35/00* (2013.01); *H04L 67/02* (2013.01); *H04L 67/125* (2013.01); *H04L 67/40* (2013.01); *B60K 2350/1028* (2013.01)

(58) Field of Classification Search
CPC .. B60R 16/037; B60H 1/00735; B60K 35/00; B60K 2350/1028; H04L 67/02; H04L 67/125; H04L 67/40

USPC .......................................................... 701/36
See application file for complete search history.

(56) References Cited

U.S. PATENT DOCUMENTS

| | | | | |
|---|---|---|---|---|
| 7,036,128 | B1 * | 4/2006 | Julia ...................... | G06F 9/465 |
| | | | | 707/E17.071 |
| 7,418,382 | B1 * | 8/2008 | Maes ................ | G06F 17/30899 |
| | | | | 704/236 |
| 8,127,060 | B2 * | 2/2012 | Doll ..................... | G05B 19/042 |
| | | | | 700/86 |
| 8,463,964 | B2 * | 6/2013 | Kostadinov .......... | G05B 19/042 |
| | | | | 700/86 |
| 8,866,604 | B2 | 10/2014 | Rankin et al. | |
| 2003/0060973 | A1 * | 3/2003 | Mathews ............... | G01C 21/26 |
| | | | | 701/410 |
| 2008/0004904 | A1 * | 1/2008 | Tran ..................... | A61B 5/0006 |
| | | | | 705/2 |

(Continued)

*Primary Examiner* — McDieunel Marc
*Assistant Examiner* — James E Stroud
(74) *Attorney, Agent, or Firm* — Jennifer M. Stec; Brooks Kushman P.C.

(57) ABSTRACT

A vehicle infotainment system includes a vehicle processor connected to a transceiver and programmed to transmit human-machine interface (HMI) data to a connected mobile device using websockets via the transceiver. The vehicle processor is further programmed to, in response to the connected mobile device via the transceiver, receive a message requesting HMI data being outputted at a vehicle display. The vehicle processor is further programmed to transmit the HMI data to the mobile device via websockets and receive a parameter adjustment via a remote procedure call for a parameter associated with the HMI data.

19 Claims, 5 Drawing Sheets

(56) References Cited

U.S. PATENT DOCUMENTS

| | | | |
|---|---|---|---|
| 2010/0191661 A1* | 7/2010 | Pritchett | G06Q 30/0185 705/318 |
| 2011/0247013 A1* | 10/2011 | Feller | G06F 21/44 709/219 |
| 2011/0289186 A1 | 11/2011 | Bell et al. | |
| 2011/0295444 A1* | 12/2011 | Westra | G06F 21/554 701/1 |
| 2012/0096272 A1* | 4/2012 | Jasper | H04L 63/0853 713/176 |
| 2013/0019252 A1* | 1/2013 | Haase | G06F 9/445 719/328 |
| 2014/0066014 A1 | 3/2014 | Nicholson et al. | |
| 2014/0122757 A1* | 5/2014 | Barrett | G06F 13/4045 710/107 |
| 2014/0129047 A1* | 5/2014 | Barrett | G07C 5/00 701/1 |
| 2014/0163771 A1 | 6/2014 | Demeniuk | |
| 2014/0282841 A1* | 9/2014 | Kurosawa | G06F 21/62 726/1 |

* cited by examiner

METHODS AND SYSTEMS FOR A MOBILE DEVICE TO EMULATE A VEHICLE HUMAN-MACHINE INTERFACE

TECHNICAL FIELD

The present disclosure generally relates to vehicle computing systems, and more particularly, to configuring the vehicle computing system as a server.

BACKGROUND

A vehicle computing system is used to provide several features and functions including hands-free calling, navigation information and music to an occupant while traveling to a destination. The vehicle computing system provides settings to allow configuration of the features and functions based on an occupant's preference. The settings may be manually configured once the occupant enters the vehicle. For example, the vehicle computing system may be configured to adjust climate control settings at the vehicle. The climate control settings may be initiated using physically-actuated inputs carried by the vehicle and manipulated by the vehicle occupant.

For a substantial amount of new vehicles being manufactured today, the control settings for the vehicle computing system include a human-machine interface (HMI) touchscreen display. The HMI touchscreen display is configured to output control settings for one or more vehicle features and functions. For example, the HMI touchscreen display may output music, climate, and navigation control settings. The settings for the vehicle computing system features and functions may be adjusted via the HMI touchscreen display. The HMI is typically positioned in the center console of a vehicle cabin so that the driver and front seat occupant may adjust control settings for the one or more vehicle features and functions.

SUMMARY

In at least one embodiment, a vehicle infotainment system includes a vehicle processor connected to a transceiver and programmed to transmit human-machine interface (HMI) data to a connected mobile device using a networking communication protocol such as a bi-directional communication channel via the transceiver. The vehicle processor is further programmed to, in response to the connected mobile device via the transceiver, receive a message requesting HMI data being outputted at a vehicle display. The vehicle processor is further programmed to transmit the HMI data to the mobile device via websockets and receive a parameter adjustment via a remote procedure call for a parameter associated with the HMI data.

In at least one embodiment, a mobile device emulation method uses a mobile device processor to mimic a vehicle HMI at a mobile device user interface screen. The method includes transmitting an HMI emulator message for current HMI data being outputted at a vehicle display to a paired vehicle system. The method further includes receiving the HMI data from the vehicle system via a full-duplex communication channel over a single connection, enabling adjustment of the HMI data at the mobile device user interface screen, and transmitting the adjusted HMI data to the vehicle system via a remote procedure call.

In at least one embodiment, a computer-program product embodied in a non-transitory computer readable medium having stored instructions for programming a processor, comprises instructions for receiving a device emulator request message for data being outputted at a vehicle display and generating the data for the vehicle display based on a websocket protocol. The computer-program product includes further instructions for transmitting the data to a mobile device and receiving a parameter adjustment associated with the data via a remote procedure call from the mobile device.

DETAILED DESCRIPTION

Figure 1:
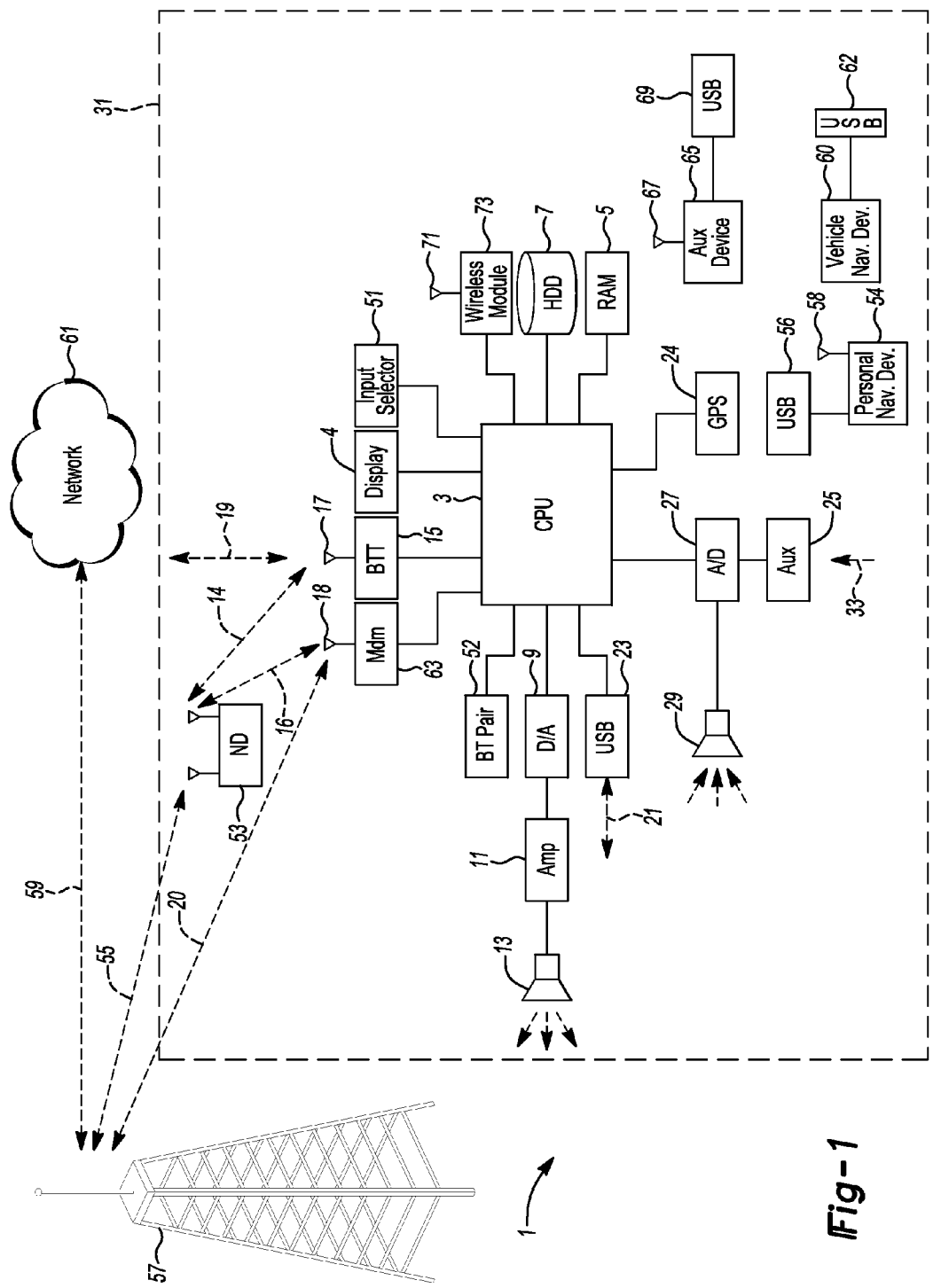
FIG. 1 is a representative topology of a vehicle computing system implementing a user-interactive vehicle information display system according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The disclosure relates to a vehicle computing system configured as a webserver such that the system may communicate with a mobile device acting as a client. The vehicle computing system may communicate vehicle features and functions to one or more clients. The vehicle computing system configured as a server allows a mobile device acting as a client within a vehicle to receive vehicle human-machine interface (HMI) information via a networking protocol. For example, the networking protocol may include, but is not limited to, a websocket, and a bi-directional or full-duplex communication channel over a single connection. The mobile device configured as a client may make adjustments to at least one parameter associated with the received vehicle HMI information using the webserver/client relationship.

For example, the mobile device may receive layouts/views based on the HMI information from the vehicle computing system via websockets. The views sent to the mobile device may emulate or resemble an HMI interface displayed on the vehicle's touchscreen display. The interface displayed on the vehicle's touchscreen display, as well as controllable vehicle parameters based on the HMI information, may be sent to the mobile device through the server and client connection.

In another example, the mobile device may include a web view mobile application that is associated with the vehicle computing system. The web view mobile application may receive at least a portion of HMI information being displayed on the vehicle touchscreen display as well as controllable parameters for the vehicle features and functions. In response to an adjustment of a controllable parameter at a mobile device user interface, the device may send a remote procedure call to the vehicle computing system containing the adjusted parameter. The remote procedure call, or any other server/client communication protocol, may include a value associated with the parameter that was adjusted at the mobile device user interface. In response to the parameter adjustment sent to the vehicle computing system, the mobile device may receive updated HMI information associated with a visual change that occurred at the vehicle touchscreen display via the websockets.

FIG. 1 illustrates an example block topology for the VCS 1 for a vehicle 31. An example of such a VCS 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, or a spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor 3 is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor 3 is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS 1 may use a vehicle network (such as, but not limited to, a CAN bus) to pass data to and from the VCS 1 (or components thereof).

Outputs to the system may include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (cell phone, smart phone, PDA, or any other device having wireless remote network connectivity, for example). The nomadic device 53 can then be used to communicate 59 with a network 61 outside the vehicle 31 through, for example, communication 55 with a cellular tower 57. In some embodiments, tower 57 may be a WiFi access point. The nomadic device 53 may also be used to communicate 84 with an accessory device such as a wearable device (smartwatch, smart glasses, etc., for example). The nomadic device 53 may communicate one or more control functions to the wearable device. For example, the nomadic device 53 may enable the wearable device to accept a phone call, enable a mobile application, receive notifications, and/or a combination thereof. In another example, the wearable device may transmit vehicle control features/functions to the VCS 1 based on one or more mobile applications executed at the nomadic device 53.

Communication between the nomadic device 53 and the BLUETOOTH transceiver is represented by signal 14. Pairing a nomadic device 53 and the BLUETOOTH transceiver 15 can be instructed through a button 52 or similar input. Accordingly, the CPU 3 is instructed so that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having an antenna 18 in order to communicate 16 data between CPU 3 and network 61 over the voice band. The nomadic device 53 may then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

For example, the CPU 3 may include hardware and software to configure the processor as a server. The CPU 3 configured as a server may communicate data associated with the VCS 1 to one or more clients. The data may include, but is not limited to, settings for the one or more vehicle features.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the nomadic device 53 includes a modem for voice band or broadband data communication. In the data-over-voice embodiment, a technique known as frequency division multiplexing may be implemented when the owner of the nomadic device 53 can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device 53, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device 53 via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Continuing from the example above, the addition sources may interface with the CPU 3 based on a server/client configuration. More specific, the CPU 3 configured as a server may execute one or more applications associated with the additional sources acting as clients. The CPU 3 may receive requests from the additional sources for vehicle content and/or function.

Further, the CPU 3 could be in communication with a variety of other auxiliary devices 65. These devices can be connected through a wireless 67 or wired 69 connections. Auxiliary device 65 may include, but are not limited to, personal media players, wireless health devices, portable computers, and the like.

Also, or alternatively, the CPU 3 could be connected to a vehicle based wireless router 73, using for example a WiFi (IEEE 803.11) 71 transceiver. This could allow the CPU 3 to connect to remote networks in range of the local router 73.

In addition to having representative processes executed by a VCS 1 located in a vehicle, in certain embodiments, the processes may be executed by a computing system in communication with a vehicle computing system. Such a system may include, but is not limited to, a mobile device (a mobile phone, a smartphone, the nomadic device 53, etc., for example) or a remote computing system (a server, for example) connected through the mobile device 53. Collectively, such systems may be referred to as vehicle associated computing systems (VACS). In certain embodiments particular components of the VACS may perform particular portions of a process depending on the particular implementation of the system. By way of example and not limitation, if a process includes sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the processes.

Figure 2:
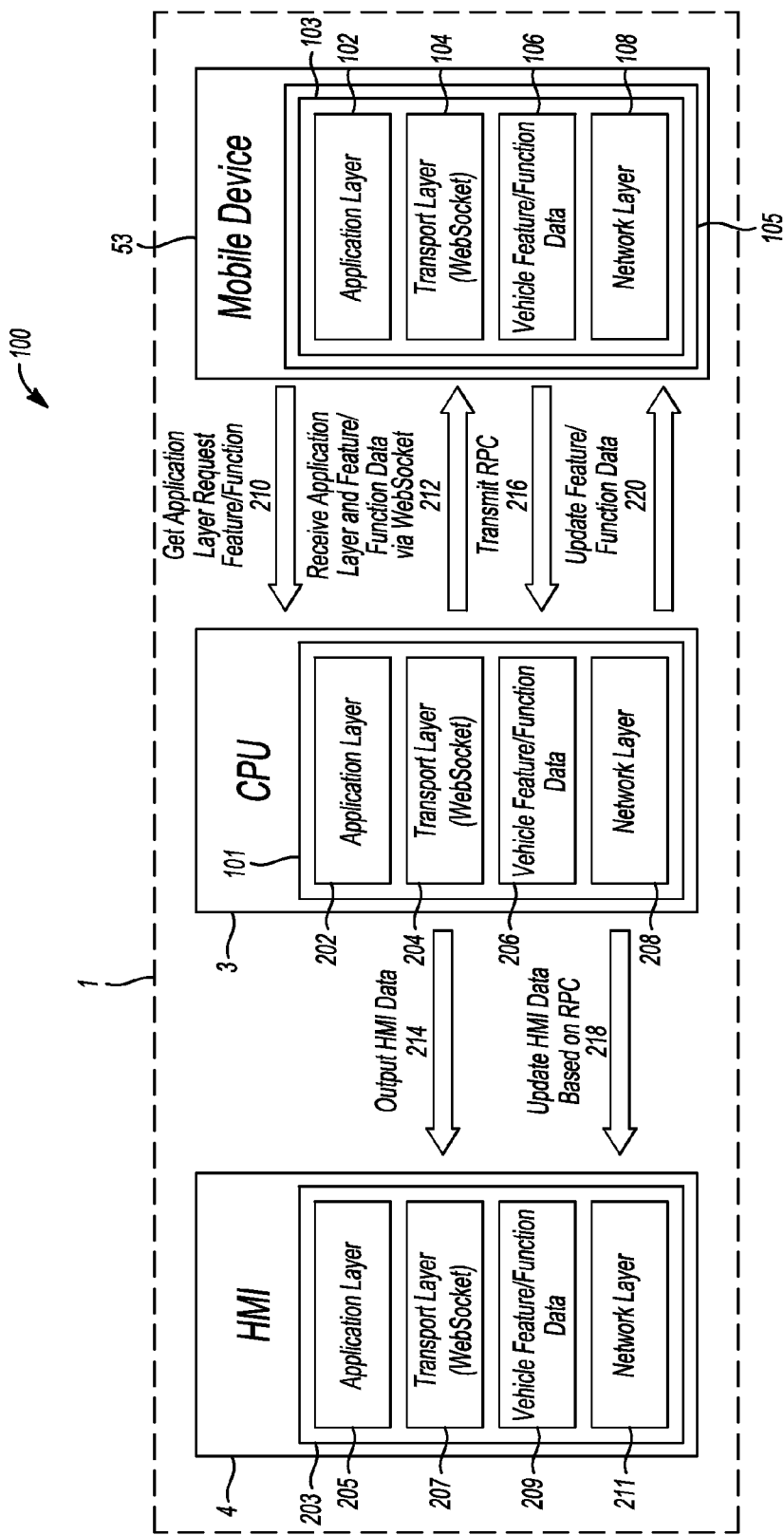
FIG. 2 is a representative block topology of the vehicle computing system communicating with a vehicle human-machine interface and a mobile device according to an embodiment.

FIG. 2 is a representative block topology of the VCS 1 communicating with a vehicle HMI 4 and a mobile device 53 according to an embodiment. The VCS 1 may include a CPU 3 configured as a server by utilizing hardware and/or software of the system. The CPU 3 may deliver HMI data as web content. In relation to the CPU 3 configured as a server, the vehicle HMI display 4 and mobile device 53 may be configured as clients when communicating with the CPU 3. The CPU 3 configured as a server may transmit HMI data via websockets to the vehicle HMI display 4 and/or the mobile device 53. The CPU 3 as a server may deliver a request to various clients using HTTP or other means of delivering HTML data such as images, scripts, etc.

The CPU 3 may be in communication with one or more transceivers. The one or more transceivers are capable of wired and wireless communication to receive and transmit signals associated with one or more vehicle features and functions. The vehicle features and functions may include configuration settings to allow a vehicle occupant to customize the vehicle feature and/or vehicle function to their preference. The CPU 3 may manage one or more vehicle features and functions based on the configuration setting(s) outputted as at least one parameter at the vehicle HMI display 4. In another example, the one or more vehicle features and functions may be managed by configuration setting(s) outputted as a parameter at a user interface of the mobile device 53. To facilitate the communication, the CPU 3 may include a vehicle server integration framework 101 to provide and communicate various vehicle features to one or more clients. The vehicle server integration framework 101 may communicate the vehicle features based on an application layer 202, transport layer 204, vehicle feature/function data 206, and a network layer 208.

The application layer 202 transports routing of messages between the vehicle HMI display 4, mobile device 53 and the VCS 1. For example, the CPU 3 application layer 202 may communicate data to clients using a predefined protocol and interface method, also known as an internet protocol suite (TCP/IP). The TCP/IP may transmit data associated with a specific vehicle application executed on hardware of the VCS 1. The transport layer 204 provides communication services for the applications executed at the VCS 1. The communication services include, but are not limited to, ensuring packets of data are not lost during transport. In one example, the one or more vehicle features and functions may transmit data via the transport layer 204 to the HMI display 4 and/or mobile device 53 using websockets. More specifically, the CPU 3 may transmit a vehicle feature to each client communicating with the CPU 3 including the HMI display 4 and the mobile device 53.

The CPU 3 may communicate data using the vehicle network (the CAN Bus, for example) with at least one control module executing the one or more vehicle features. The CPU 3 may process the communicated data associated with the one or more vehicle features. The vehicle feature/function data 206 may be processed by the CPU 3 for output at the HMI display 4. The mobile device 53 configured as a client may emulate the HMI display 4 by outputting the vehicle feature/function data at a mobile device user interface. The vehicle feature/function data 206 may be communicated to the HMI display 4 and/or mobile device 53 via the websockets.

The network layer 208 may provide functional means of transferring variable-length data sequences from the CPU 3 to the client (vehicle HMI display 4 and mobile device 53, for example). The network layer 208 may provide data forwarding to additional clients in communication with the HMI display 4 and/or mobile device 53. In one example, the network layer 208 may provide vehicle feature/function data 206 to be communicated to a mobile device 53 in communication with the vehicle HMI display 4 via the CPU 3.

The vehicle HMI display 4 may be configured as a client in communication with the CPU 3. The vehicle HMI display 4 may further include an HMI integration client component 203 to allow the display to take advantage of the services provided by the vehicle server integration framework 101. The HMI integration client component 203 is executed on hardware (a processor, for example) at the system. The HMI integration client component 203 may include an application layer 205, a transport layer 207, vehicle feature/function data 209, and a network layer 211.

The websockets may be utilized to output vehicle feature/function data to the client via the transport layer 204. The websocket specification, developed as part of the HTML5 initiative, introduced the WebSocket JavaScript interface. The websocket interface allows a full-duplex single socket connection in which messages may be sent between a client (vehicle HMI display 4 and mobile device 53, for example) and server (CPU 3, for example). The websocket standard simplifies much of the complexity around bi-directional web communication and connection management. The use of websockets makes it possible for real time updating of the context-based HMI data for different user scenarios. For example, the vehicle feature may include a climate control system having climate control data. The climate data may be displayed at the HMI display 4 via a persistent websocket connection between the CPU 3 and the vehicle HMI display 4. This may allow for the vehicle occupant to interact directly with the HMI display 4 based on the climate data.

For example, the CPU 3 may receive data via the vehicle CAN Bus, mobile device 53, the remote network 61, and a combination thereof. The CPU 3 may generate HMI data for the HMI display 4 and/or mobile device user interface. Numerous combinations of different data may be utilized to provide the output of the HMI data. The different combinations of the data allow for updates of applications to be available. The HMI data may be generated in real time on the CPU 3 and/or other hardware on the VCS 1. The HMI data may be served to the one or more clients which may include the vehicle HMI display 4 and the mobile device 53.

The VCS 1 of FIG. 2 may be capable of communicating with the remote network 61. The VCS 1 may connect to the remote network 61 via a BLUETOOTH mobile device 53 paired with the vehicle system, an embedded cellular connection, and/or both a long-rang/short-range wireless connection. The remote network 61 may also be accessible by other mobile devices and/or vehicle systems. Additionally, accessibility may require various security restrictions in order to allow for access to the vehicle's remote network 61. The VCS 1 may communicate different types of relevant data to the remote network 61 utilizing websockets. This allows for full-duplex communication channels via a single TCP connection. Thus a web browser or web server of a client or server application may utilize the websocket API to facilitate live real-time updating of content. For example, the CPU 3 may receive additional data via the remote network 61 and transmit the data to the HMI display 4 and/or mobile device 4 via the websocket API. Although the websocket API and protocol are utilized in this example, other similar alternative embodiments may be utilized.

The VCS 1 may interface with more than one mobile device 53 brought into the vehicle. As mentioned above, the CPU 3 configured as a server may interface with one or more clients in communication with the VCS 1. The mobile device 53 may further include a mobile integration client component 103 to allow the device to take advantage of the services provided by the vehicle server integration framework 101. The mobile integration client component 103 may be referred to as an application. The application is executed on hardware (a processor 105, for example) at the mobile device 53. The mobile integration client component may include an application layer 102, a transport layer 104, vehicle feature/function data 106, and a network layer 108. The application may communicate data from the mobile device 53 to the VCS 1 via the transceiver.

The mobile device 53 may communicate application data with a CPU 3 via wireless technology. The wireless technology may include BLUETOOTH Low Energy (BLE). In another example, the mobile device 53 may communicate with the VCS 1 via a network 61 connection. The mobile device 53 may receive application data executed at the CPU 3 using the mobile device client integration component 103. For example, the mobile device 53 may receive vehicle data including one or more infotainment settings for the vehicle computing system. The mobile device 53 may output the received vehicle infotainment settings at the mobile device user interface.

In one example, in response to establishing communication with the CPU 3, the mobile device 53 may request 210 an application layer for HMI data being output at the HMI display 4. The mobile device 53 may receive 212 the application layer having vehicle feature/function data via a websocket. The CPU 3 may transmit 214 the vehicle feature/function data to the HMI display 4 via a websocket. In response to an adjustment of a vehicle feature at the user interface of the mobile device 53, the device may transmit 216 a remote procedure call to the CPU 3.

For example, the vehicle HMI display 4 and mobile device user interface may display a climate setting set to a value for a climate system. The mobile device 53 may receive a request to adjust the climate setting (a parameter, for example) to a new value via the mobile device user interface. Now, the new value at the mobile device user interface is different from the value of the climate setting being displayed at the vehicle HMI display 4. In response to the adjusted climate setting, the mobile device may transmit the new value for the climate setting via a remote procedure call.

The CPU 3 may adjust the infotainment setting based on the received remote procedure call. The CPU 3 may transmit 218 the updated vehicle feature to the HMI display 4 based on the remote procedure call from the mobile device 53. The mobile device 53 may receive 220 updated feature/function data to output at the mobile device user interface.

Figure 3:
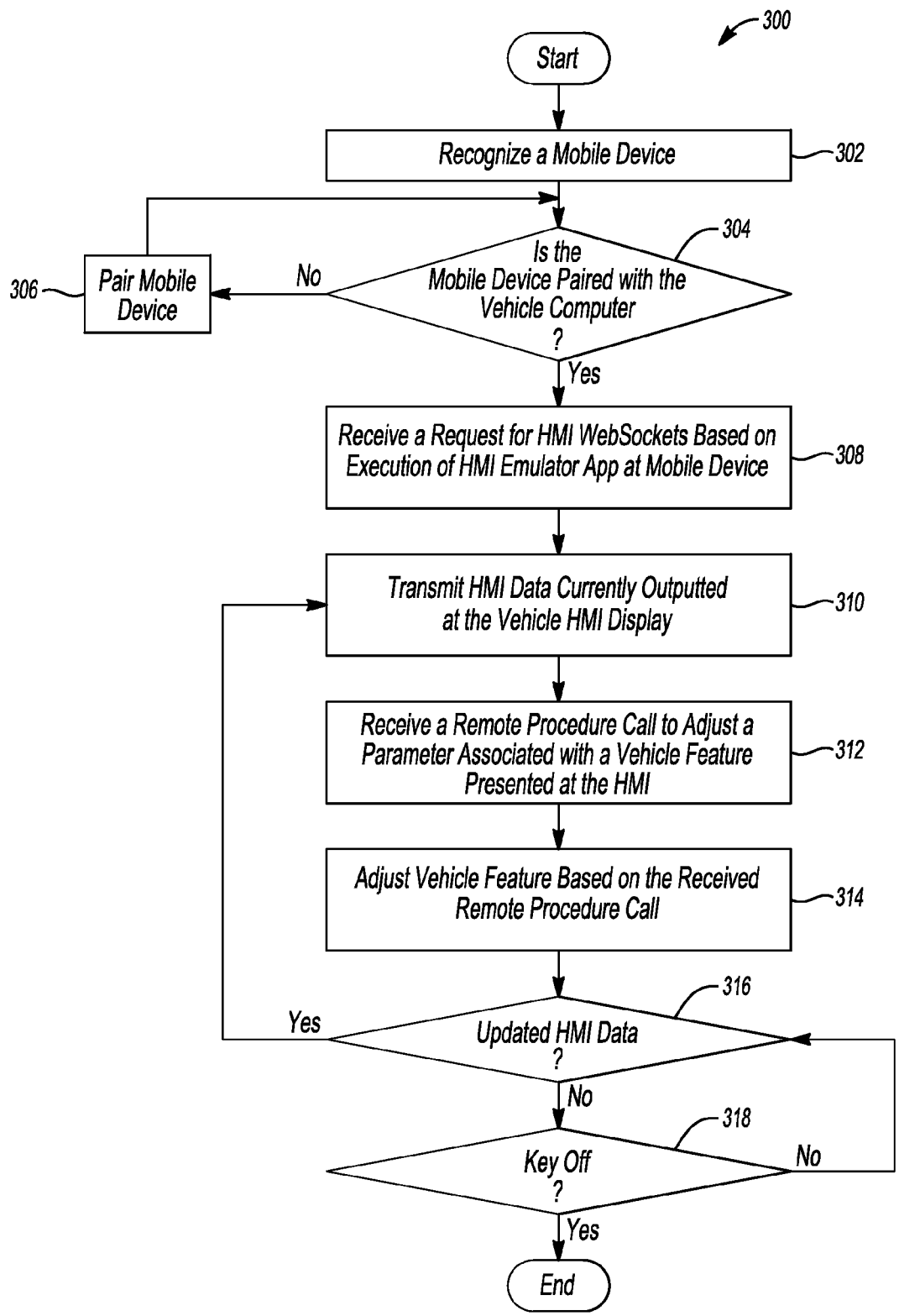
FIG. 3 is a flow chart illustrating an example method of the vehicle computing system configuring the mobile device to emulate the human-machine interface display according to an embodiment.

FIG. 3 is a flow chart illustrating an example method of the VCS 1 configuring the mobile device 53 to emulate the vehicle HMI display 4 according to an embodiment. The method 300 may be implemented using software code contained within the VCS 1, mobile device 53, and/or a combination thereof.

Referring again to FIG. 3, the vehicle 31 and its components illustrated in FIG. 1 and FIG. 2 are referenced throughout the description of the method 300 to facilitate understanding of various aspects of the present disclosure. The method 300 of emulating the vehicle HMI display on the mobile device user interface may be implemented through a computer algorithm, machine executable code, or software instructions programmed into a suitable programmable logic device(s) of the vehicle, such as the CPU 3, the nomadic device control module, a remote network, another controller in communication with the vehicle computing system, or a combination thereof. Although the various operations shown in the flowchart diagram 300 appear to occur in a chronological sequence, at least some of the operations may occur in a different order, and some operations may be performed concurrently or not at all.

In operation 302, the VCS 1 may be initialized and enabled based on a key-on position or state of an ignition system. The VCS 1 may initialize one or more applications for execution. In response to the initialization of the VCS 1, the system may display the one or more applications at the vehicle HMI display 4. For example, the VCS 1 may execute a navigation application via the vehicle integration framework. The navigation application may communicate with a mobile device 53, a remote network 61, or a combination thereof.

In operation 304, the VCS 1 may establish communication with the mobile device 53. In response to a recognized mobile device not previously paired with the system, the VCS 1 may provide instructions to the occupant to pair the mobile device 53 in operation 306. The VCS 1 may search for a mobile device 53 if a device is not connected to the VCS 1.

In operation 308, the VCS 1 may receive a request for HMI websockets based on the execution of an HMI emulator application at the mobile device 53. For example, the VCS 1 may output HMI data associated with the navigation application. The VCS 1 may output the HMI data to the vehicle HMI display 4. The VCS 1 may transmit at least a portion of the HMI data currently outputted at the vehicle HMI display 4 to the mobile device in operation 310.

For example, the VCS 1 may transmit navigation information via websockets to the HMI display based on the navigation application being executed using hardware and software at the VCS 1. In response to a connected mobile device 53 executing the HMI emulator application, the VCS 1 may transmit the navigation information via websockets to the mobile device 53. The mobile device 53 may output a mirror image of the vehicle HMI display 4 based on the received navigation information. The mobile device 53 may be configured to resize the navigation information based on the specifications of the user interface screen of the device.

In operation 312, in response to the HMI data transmitted to the mobile device 53, the VCS 1 may receive a remote procedure call from the mobile device 53 to adjust a parameter associated with HMI data presented at the vehicle HMI display 4. More specific, the HMI data may include a vehicle feature parameter being displayed at the mobile device user interface. The vehicle feature parameter outputted at the mobile device user interface may mirror the vehicle HMI display. The mobile device user interface may allow a user to adjust the vehicle feature parameter such that it no longer mirrors the vehicle HMI display. In response to the user adjusting the vehicle feature parameter, the mobile device transmits the adjusted parameter to the VCS 1 via the remote procedure call. The VCS 1 may adjust the vehicle feature parameter based on the received remote procedure call in operation 314.

Continuing from the example above, the VCS 1 may receive an adjustment to a parameter via a remote procedure call associated with the navigation application. The parameter may include, but is not limited to, a point-of-interest (POI), a destination, map view controls, and a combination thereof. For example, the parameter may be a POI selected at a passenger's mobile device. The POI selected may not be presented at the vehicle HMI display 4. The mobile device 53 may transmit the selected POI to the VCS 1 via a remote procedure call. The VCS 1 may receive the POI and adjust the navigation information outputted at the vehicle HMI display 4 to include the selected POI via websockets.

In operation 316, the VCS 1 may determine if the remote procedure call adjusted the HMI data being transmitted to the vehicle HMI display 4. If the HMI data being outputted at the vehicle HMI display 4 has changed, the VCS 1 may transmit the updated HMI data to the mobile device 53 via websockets. The VCS 1 may continue to monitor the HMI data to determine if the information outputted at the HMI has been adjusted. The VCS 1 may end the method of emulating the vehicle HMI display on the mobile device user interface display if the mobile device 53 is no longer connected and/or a key-off position of the ignition system is detected in operation 318.

Figure 4:
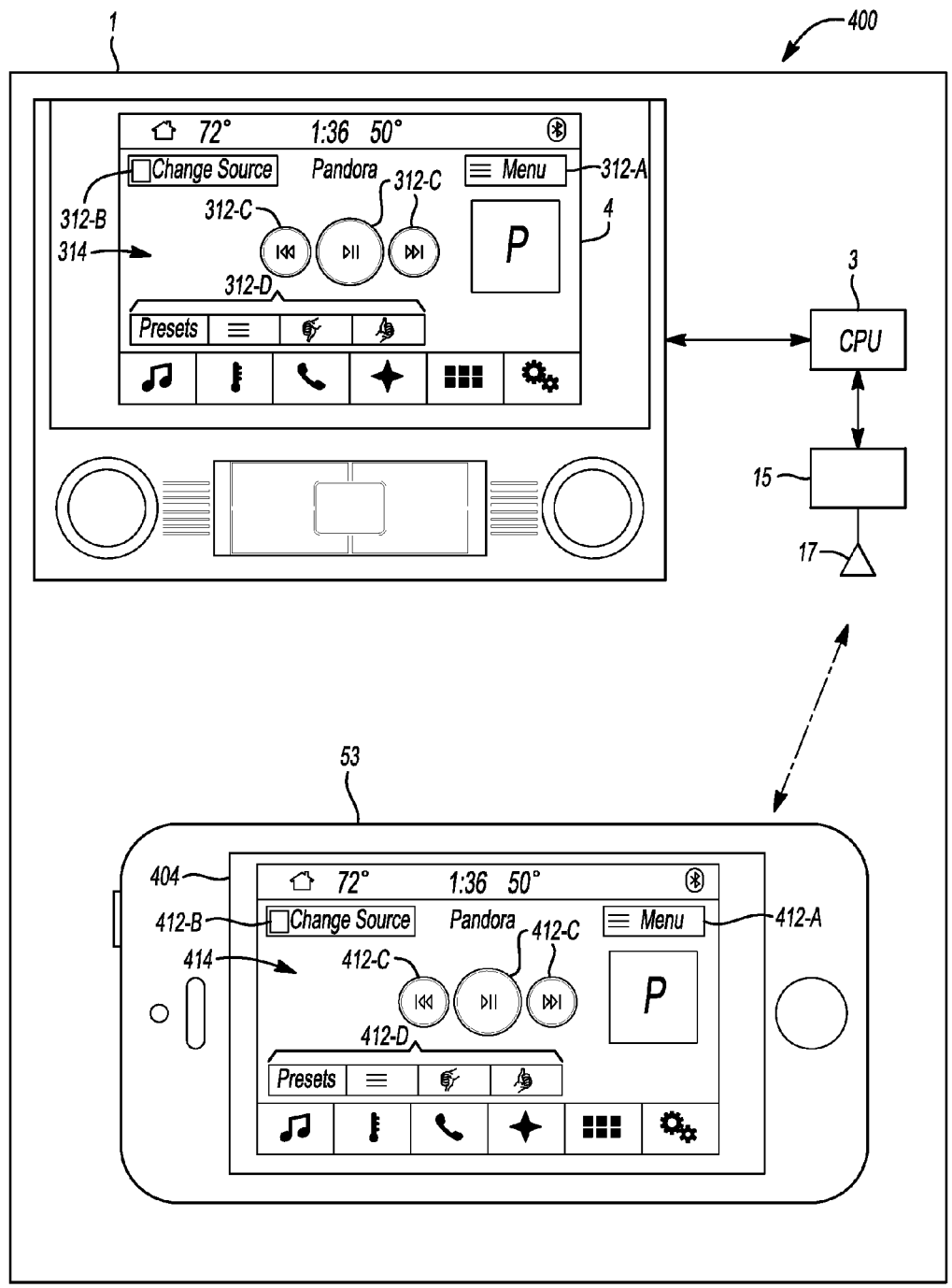
FIG. 4 is a representative block topology of the mobile device user interface emulating the vehicle human-machine interface display according to an embodiment.

FIG. 4 is a representative block topology of the mobile device user interface 404 emulating the vehicle HMI display 4 according to an embodiment. The VCS 1 may transmit the HMI data including settings, information and/or notifications to the mobile device 53 via websockets. For example, the VCS 1 may be executing a music application such as Pandora®. The VCS 1 may output one or more parameters based on the HMI data associated with the music application. The one or more parameters may be presented at the vehicle HMI display 4 and may include a list control 314 configured to display selectable list entries 312-A through 312-D (collectively 312) of the music application. The VCS 1 may enable the occupant to choose each of the selectable list entries 312 based on data received from the music application.

As illustrated in FIG. 4, the selectable list 314 of the parameters includes an entry 312-A for requesting main menu parameters, an entry 312-B for changing the music source, an entry 312-C for controlling media controls such as play/pause, fast forward and reverse, and an entry 312-D for providing feedback associated with the current sound being played to customize a play list. The VCS 1 may communicate the list control 314 to the vehicle HMI display 4 via websockets.

For example, the VCS 1 having the CPU 3 configured as a server may operate similar to a web server with websocket support. The vehicle HMI display 4 may simply be a browser that, for example, support HTML 5 and websockets. The CPU 3 may receive data from a vehicle data bus, vehicle sensors, a remote network, one or more vehicle modules, a mobile device, and a combination thereof. Upon receiving the data, the VCS 1 may generate context aware visual and audio metadata. The metadata may then be sent from the CPU 3 to one or more clients. The one or more clients may include, but are not limited to, the vehicle HMI display 4, mobile device 53, or browser on a personal computer. More specifically, the CPU 3 may transmit the data to the vehicle HMI display 4 and a connected mobile device 53 via websockets.

Continuing from the example above, the mobile device 53 executing the HMI emulator application may receive the one or more parameters associated with the music application. The one or more parameters may be presented at the mobile device user interface 404 and may include a list control 414 configured to display selectable list entries 412-A through 412-D (collectively 412) of the music application. In response to the HMI data being outputted at the vehicle HMI display 4, the main menu entry 412-A, the music source entry 412-B, the media controls entry 412-C, and the feedback entry 412-D may be mirrored on the mobile device user interface 404. In response to one or more parameters being adjusted at the mobile device user interface 404, the mobile device 53 may transmit a remote procedure call to the CPU 3.

For example, if the media controls 412-C are selected at the mobile device user interface 404, the mobile device 53 may transmit the selected media control via a remote procedure call to the CPU 3. In response to the remote procedure call, the CPU 3 may control the music application based on the user selecting the media control at the mobile device user interface 404. The CPU 3 may transmit updated HMI data associated with the selected media control to the vehicle HMI display 4 and/or the mobile device user interface 404 via websockets.

In another example, the mobile device 53 may or may not have a vehicle interface application running in order to utilize the HMI data for various vehicle controls. The mobile device 53 may allow a browser executed on hardware on the device to request HMI data from the VCS 1 configured as a server. Further, the mobile device 53 may be utilized to control various parts, components, or modules of the VCS 1. In one example, the mobile device 53 may receive telephone controls to operate the vehicle wireless telephone features. However, any and all modules, components, or computers of the vehicle may be utilized. Some examples include, but are not limited to, radio, navigation, sun roof, moon roof, trunk, lights, etc. This embodiment demonstrates a wireless transceiver 15 communicating with the mobile device 53. Various wireless transceivers may include a Wi-Fi transceiver, Bluetooth transceiver, near field communication (NFC), infrared, etc., although a wireless transceiver is shown in the embodiment for the vehicle to communicate with the mobile device, a wired solution (USB, Serial, CAN, Firewire, etc., for example) may be possible.

The CPU 3 configured as a server may generate or output HMI data to various displays of the vehicle configured as clients. The CPU 3 as a server may include a CAN Bus/USB manager to communicate data through the vehicle network infrastructure. The CPU 3 may be in communication with one or more transceivers to communicate with other modules. The CPU 3 may receive data that may be utilized as HMI data from the other modules. The HMI data delivered through websockets may interface with different operating systems associated with the displays. For example, the CPU 3 may transmit HMI data to a mobile device executing iOS or Android. The mobile device may output the received HMI data formatted for a screen size and resolution of the mobile device user interface 404.

Figure 5:
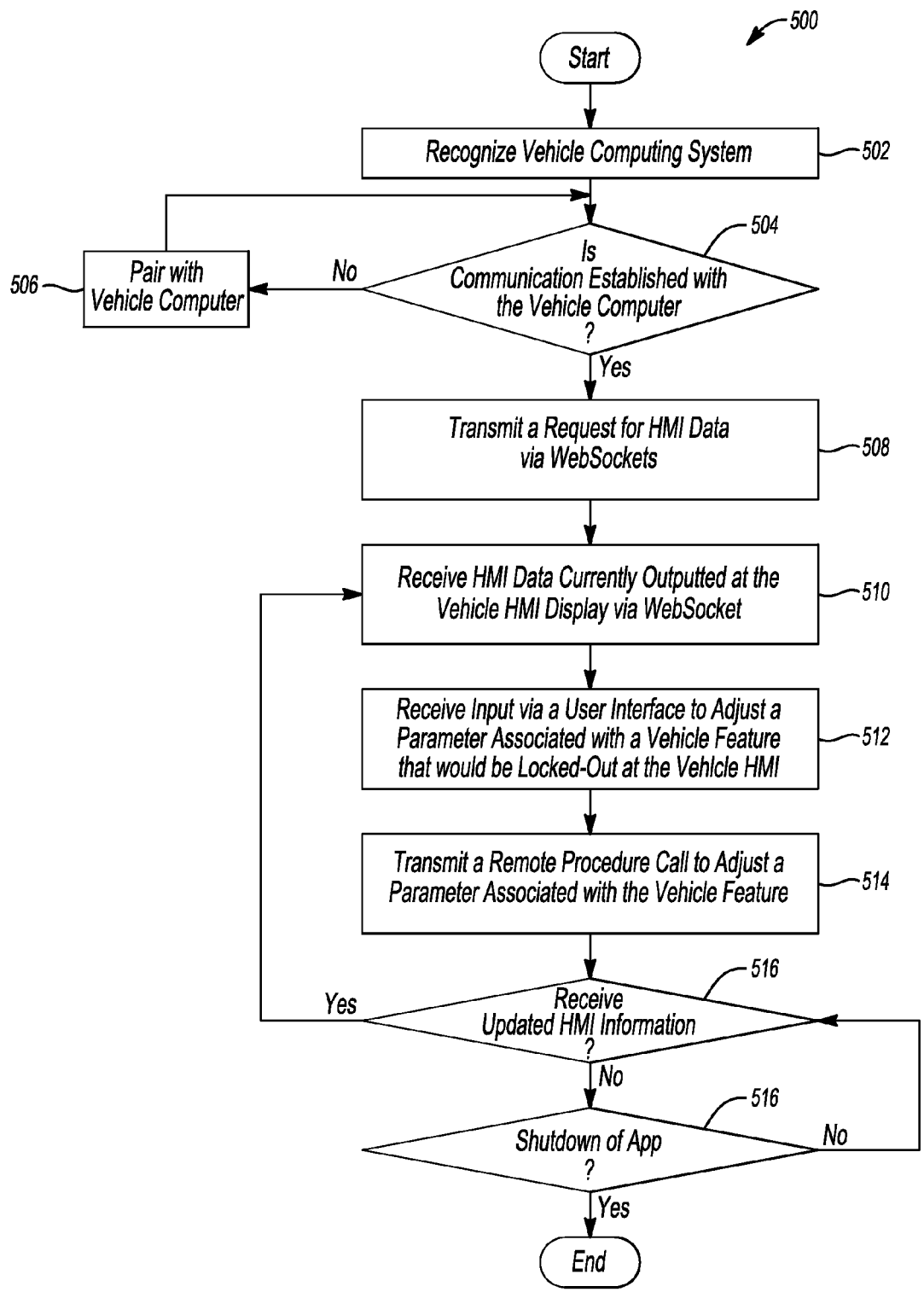
FIG. 5 is a flow chart illustrating an example method of the mobile device user interface allowing an adjustment of a parameter available at the vehicle human-machine interface display according to an embodiment.

FIG. 5 is a flow chart illustrating an example method of the mobile device user interface allowing an adjustment of a parameter available at the vehicle HMI display 4. The method 500 may be implemented using software code contained within the VCS 1, remote network 61, nomadic device 53, and/or a combination thereof.

Referring again to FIG. 5, the vehicle 31 and its components illustrated in FIG. 1, FIG. 2, and FIG. 4 are referenced throughout the description of the method 500 to facilitate understanding of various aspects of the present disclosure. The method 500 of adjusting a vehicle setting at the mobile device via a remote procedure call may be implemented through a computer algorithm, machine executable code, or software instructions programmed into a suitable programmable logic device(s) of the vehicle, such as the CPU 3, the mobile device control module, another controller in communication with the vehicle computing system, or a combination thereof. Although the various operations shown in the flowchart diagram 500 appear to occur in a chronological sequence, at least some of the operations may occur in a different order, or may be repeatedly performed, and some operations may be performed concurrently or not at all.

The mobile device 53 may be initialized and enabled based on a turn-on request or state of a mobile device operating system. The mobile device may initialize one or more applications for execution. In response to the initialization of the mobile device 53, the device may communicate with a VCS 1.

In operation 502, the mobile device may recognize a VCS using wireless technology. The mobile device may determine if a connection to communicate with the VCS 1 is established in operation 504. The mobile device 53 may execute a pairing process for a vehicle if a VCS 1 is not recognized by the mobile device in operation 506. Once the pairing process is complete, the mobile device 53 may recognize the VCS 1 as a server. In addition, the VCS 1 may recognize the mobile device 53 as a client. In response to the established communication with the VCS 1, the mobile device 53 may transmit a request for HMI data via websockets in operation 508.

In operation 510, the mobile device 53 may receive HMI data currently being outputted at the vehicle HMI display 4. The mobile device 53 may output the HMI data such that the mobile device user interface 404 emulates the vehicle HMI display 4. The mobile device 53 may receive user input to adjust a parameter associated with a vehicle feature at the mobile device user interface 404 in operation 512. In one example, the parameter may include a vehicle feature option that would be locked-out at the vehicle HMI display 4 during operation of the vehicle. However, since the mobile device 53 may be operated by a non-driver, the parameter typically locked-out at the vehicle HMI display 4 may be available for adjustment at the mobile device user interface 404.

For example, one or more navigation parameters for the navigation application may be locked-out at the vehicle HMI display 4 during vehicle operation. If determined by the VCS 1 that the connected mobile device 53 belongs to a non-driver, the mobile device 53 may unlock the navigation parameters associated with the navigation application that would typically be locked-out during vehicle operation. However, modification of the navigation parameters using the HMI display 4 may remain unavailable.

In operation 514, the mobile device 53 may transmit a remote procedure call to adjust the parameter associated with the vehicle feature based on user input at the mobile device user interface. In response to the transmitted remote procedure call, the mobile device 53 may receive updated HMI information in operation 516.

The mobile device may continue to receive HMI data via websockets. The mobile device 53 may end the method of communicating with the VCS 1 as a server/client configuration if the mobile device is no longer in communication with the VCS 1 and/or the mobile device application is no longer being executed in operation 518.

While representative embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
   a vehicle processor configured with a transceiver and programmed to,
      in response to a recognized mobile device connected via the transceiver, receive a message requesting human-machine interface (HMI) data for output to a vehicle display; and
      transmit the HMI data to the mobile device via a bi-directional communication channel formatted for a screen size and resolution of a user interface screen of the mobile device; and
      receive a parameter adjustment for a parameter associated with the HMI data from the recognized mobile device via a remote procedure call.

2. The system of claim 1, wherein the HMI data includes one or more parameters associated with at least one of a vehicle feature or function.

3. The system of claim 2, wherein the one or more parameters at the vehicle display and at a mobile device user interface no longer have mirrored settings based on the parameter adjustment.

4. The system of claim 3, wherein the vehicle processor is further programmed to, compare the parameter adjustment to the one or more parameters and update the HMI data based on the parameter adjustment.

5. The system of claim 4, wherein the vehicle processor is further programmed to, in response to the adjustment of the one or more parameters associated with the at least one of the vehicle feature or function, transmit updated HMI data to the recognized mobile device.

6. The system of claim 5, wherein the at least one of the vehicle feature or function includes a climate system, radio controls, navigation system, and phone controls.

7. The system of claim 6, wherein the processor is further programmed to, in response to the adjustment of the one or more parameters associated with the climate system, transmit climate data as the updated HMI data to the recognized mobile device.

8. The system of claim 1, wherein the HMI data is configured to output information at a mobile device user interface mirroring the vehicle display.

9. The system of claim 8, wherein the mobile device user interface is configured to receive user input to adjust the parameter associated with the HMI data.

10. A mobile device emulation method comprising:
    transmitting, via a mobile device processor paired to a vehicle system, a human-machine interface (HMI) emulator message for output to a vehicle display;
    receiving the HMI data from the vehicle system via a full-duplex communication channel over a single connection;
    formatting the HMI data for a screen size and resolution of the mobile device user interface screen; and
    transmitting HMI data adjusted using the screen to the vehicle system via a remote procedure call.

11. The method of claim 10, wherein the HMI data includes one or more parameters associated with at least one of a vehicle feature or function outputted at the vehicle display.

12. The method of claim 11, further comprising receiving a parameter adjustment, via the mobile device user interface screen, for the one or more parameters associated with the at least one of the vehicle feature or function.

13. The method of claim 10, wherein the mobile device processor receives the HMI data via a browser.

14. The method of claim 10, further comprising receiving updated HMI data from the vehicle system via websockets based on the adjusted HMI data.

15. The method of claim 10, wherein the HMI data includes a climate system, radio controls, navigation system, and phone controls.

16. A computer-program product embodied in a non-transitory computer readable medium having stored instructions for programming a processor, comprising instructions for:
- receiving a device emulator request message for data being outputted at a vehicle display;
- transmitting via a websockets protocol the data to a mobile device formatted for a screen size and resolution of the mobile device; and
- receiving a parameter adjustment associated with the data from the mobile device via a remote procedure call.

17. The computer-program product of claim 16, wherein the non-transitory computer readable medium further comprises instructions for adjusting a vehicle feature based on the parameter adjustment.

18. The computer-program product of claim 17, wherein the non-transitory computer readable medium further comprises instructions for:
- in response to the adjusted vehicle feature, transmitting updated HMI data to the mobile device.

19. The computer program product of claim 16, wherein the data includes parameters associated with a climate system, radio controls, navigation system, and phone controls.

* * * * *